(12) United States Patent
Jordan et al.

(10) Patent No.: US 7,382,316 B2
(45) Date of Patent: Jun. 3, 2008

(54) METHOD FOR CONTROLLING A RADIO TRANSMISSION

(75) Inventors: Markus Jordan, Essen (DE); Axel Klein, München (DE); Lars Schmitt, Aachen (DE); Ingo Viering, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 11/727,178

(22) Filed: Mar. 23, 2007

(65) Prior Publication Data

US 2007/0225045 A1    Sep. 27, 2007

(30) Foreign Application Priority Data

Mar. 23, 2006    (EP)    .................................. 06006017

(51) Int. Cl.
*H04B 7/005* (2006.01)
(52) U.S. Cl. .......................................... 342/367; 342/58
(58) Field of Classification Search .................. 342/58, 342/359, 367, 372, 432; 455/63.4, 562.1
See application file for complete search history.

(56) References Cited

U.S. PATENT DOCUMENTS

| | | | | |
|---|---|---|---|---|
| 3,181,142 A | * | 4/1965 | Villiers | ......................... 342/49 |
| 3,790,942 A | * | 2/1974 | Becavin et al. | ............. 342/398 |
| 5,765,098 A | * | 6/1998 | Bella | .......................... 455/13.3 |
| 5,894,598 A | | 4/1999 | Shoki | |
| 2003/0227409 A1 | | 12/2003 | Auger | |

FOREIGN PATENT DOCUMENTS

| | | |
|---|---|---|
| EP | 1 365 610 A1 | 11/2003 |
| GB | 2 390 778 A1 | 1/2004 |

OTHER PUBLICATIONS

P. Viswanath et al. "Opportunistic Beamforming Using Dumb Antennas"; IEEE Transactions on Information Theory, vol. 48, No. 6, Jun. 2002; pp. 1277-1294.
M. Gurelli et al., "Capacity Simulation of cdma2000 1xEV-DO Forward Link with Opportunistic Beam Forming"; IEEE Globecom 2003; pp. 1136-1140.
A. Senst et al., "Random Beamforming in Correlated MISO Channels for Multiuser Systems", IEEE International Conference on Communications, 2004, pp. 2909-2913.
European Search Report for Application No. EP 06 00 6017; mailed Sep. 8, 2006.

* cited by examiner

*Primary Examiner*—Dao L Phan
(74) *Attorney, Agent, or Firm*—Staas & Halsey LLP

(57) ABSTRACT

At least one radiation pattern is rotated at a first radio station for the purpose of sampling a predefined angular range. At a first time of rotation, a second radio station is detected with a first angular position within the angular range corresponding to the first time. The second radio station determines a first quality value which can be assigned to the first angular position and reports the first quality value back to the first radio station. The first quality value is available for evaluation at the first radio station at a second time corresponding to a second angular position of the radiation pattern. The first radio station controls the speed of rotation of the at least one radiation pattern for subsequent rotations so that the first angular position corresponds to the second angular position.

13 Claims, 5 Drawing Sheets

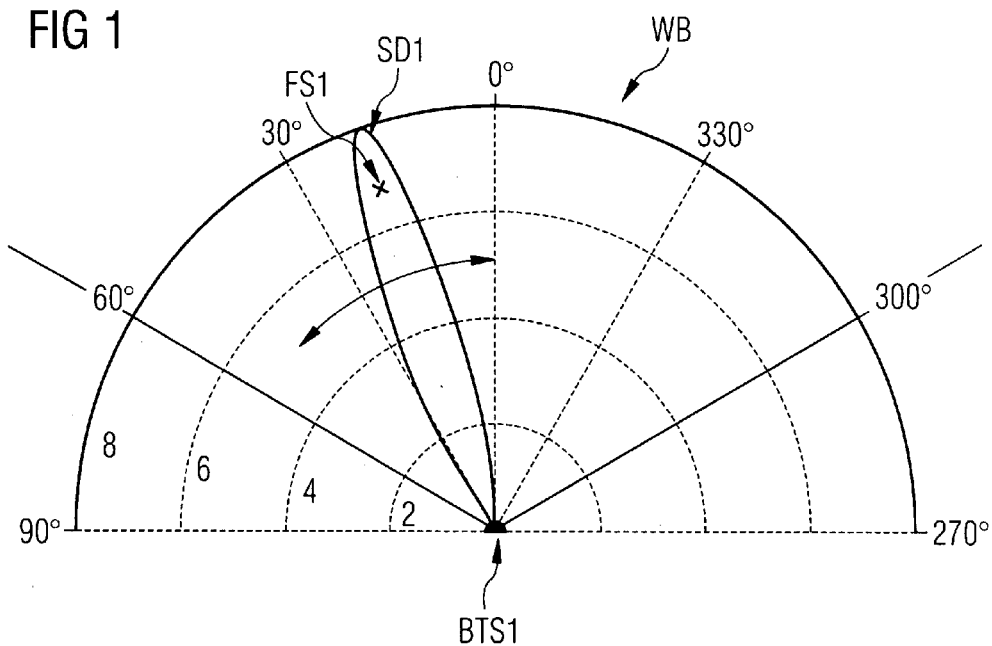
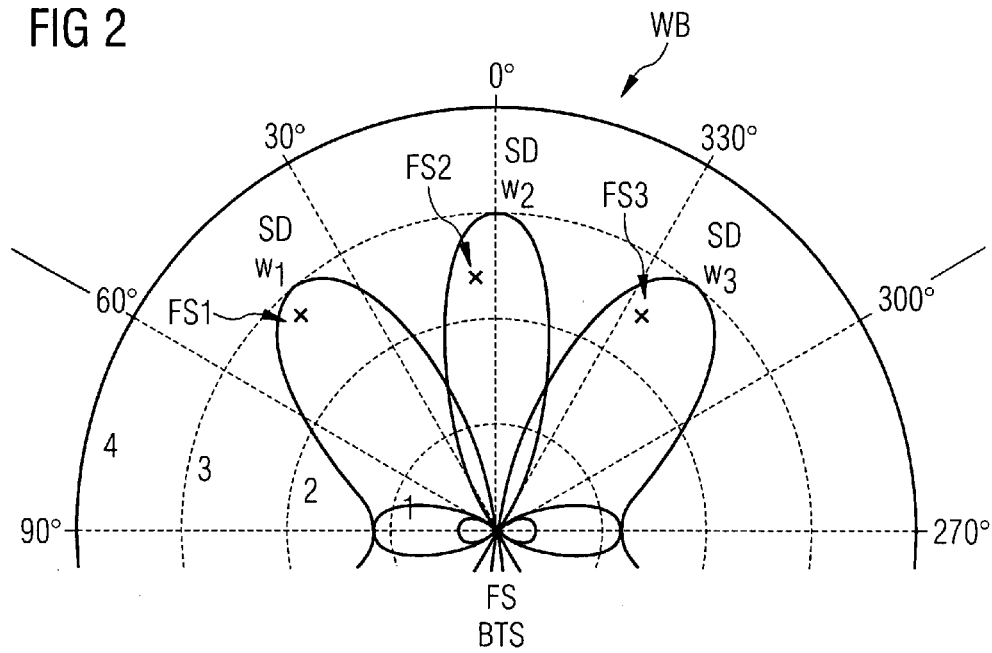

FIG 3

| Time | 1 | 2 | 3 | 4 | 5 | 6 | 7 |
|---|---|---|---|---|---|---|---|
| SD | $w_1$ | $w_2$ | $w_3$ | $w_1$ | $w_2$ | $w_3$ | $w_1$ |
| SNR at FS1 | $SINR_1$ | $SINR_2$ | $SINR_3$ | $SINR_4$ | $SINR_5$ | $SINR_6$ | $SINR_7$ |
| SNR at BTS |  |  |  | $SINR_1$ | $SINR_2$ | $SINR_3$ | $SINR_4$ |

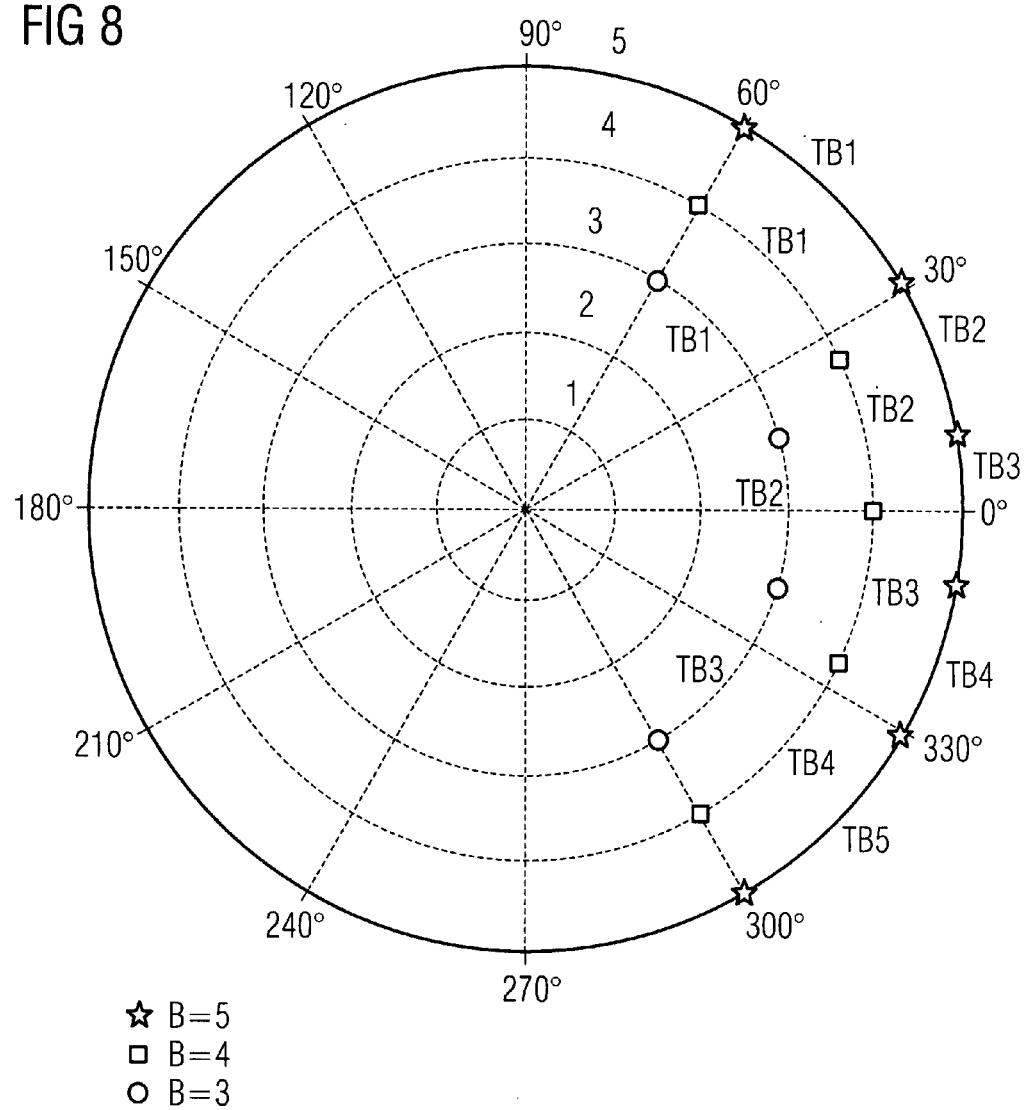

METHOD FOR CONTROLLING A RADIO TRANSMISSION

CROSS REFERENCE TO RELATED APPLICATIONS

This application is based on and hereby claims priority to European Application No. 06006017 filed on Mar. 23, 2006, the contents of which are hereby incorporated by reference.

BACKGROUND OF THE INVENTION

Beamforming methods are generally used in the downlink on the part of a base station to achieve improvements in reception on mobile radio communication terminals. Improvements in the reception of transmitted signals are achieved by beamforming methods which are employed on the transmission side and which can be implemented with the aid of what is termed a SMART antenna array.

In the related art, groups of radio communication terminals are formed based on a respective angular position, it then being possible to provide radio coverage to an individual group by a directed radiation pattern.

Depending on the resolution or, as the case may be, width of the radiation patterns used to provide radio coverage to groups it is possible, because of the spatial orientation of the radiation patterns, to provide radio coverage to a comparatively high number of radio communication terminals using the same radio transmission resources (such as carrier frequency, timeslot, code, etc.). Based on the resolution, width and spatial orientation of the radiation patterns it is possible, despite the use of the same radio transmission resources, to reduce disruptive interference signals in the radio communication system as a result of the directed transmission.

For the improved use of beamforming methods it is necessary always to know the current angular positions of receiving radio stations that are to be provided with radio coverage by a transmitting radio station.

In particular in the case of a mobile radio system in which positions of mobile terminals can change quickly it is necessary to detect changes in position quickly in order, where appropriate, to be able to update a covering radiation pattern or in order to carry out a new assignment of a terminal to a radiation pattern. In this way it is made possible to avoid an existing radio connection between a transmitting radio station, for example a base station, and a receiving radio station, for example a terminal, being lost.

It is common practice at the present time to use what are termed "opportunistic beamforming" methods with which, for example, a radio cell or a predefined angular range is sampled and provided with radio coverage on the part of a base station that has a suitable antenna array with the aid of a rotatable radiation pattern.

FIG. 1 shows such an angular range WB which is embodied, for example, as a 120° sector of a radio cell. A rotatable radiation pattern SD1 is formed—generally using digital signal processing in the baseband on the part of a base station BTS1—with the aid of an adaptive beamforming method. The radiation pattern SD1 samples by way of example the illustrated angular range WB from 60° through 0° to 300°.

At measuring times a radio station FS1 determines quality values which allow a time-related assessment of a radiation pattern signal transmission. Measured "signal-to-interference-noise ratio" (SINR) values, for example, can be used as quality values.

If the radio station FS1 is detected by the rotating radiation pattern SD1, the radio station FS1 will measure a correspondingly greater SINR value than at times at which the radio station FS1 is not detected by the rotating radiation pattern SD1.

The measured SINR values are reported back to the base station BTS1. The latter decides, based on the reported SINR values, whether and how the base station BTS1 will perform a radio or, as the case may be, data transmission to the radio station FS1.

If a correspondingly large SINR value is reported back, a radio transmission of data can take place from the base station BTS1 to the radio station FS1, since the latter is detected by the rotating radiation pattern SD1.

If, on the other hand, the radio station FS1 is not detected by the rotating radiation pattern SD1, the reported SINR value is correspondingly small and no radio transmission of data would take place from the base station BTS1 to the radio station FS1.

In a method of this kind two opposing ancillary conditions need to be taken into account during the sampling in a compromise to be chosen:

On the one hand the sampling of the radio cell should be performed as quickly as possible in order to provide each radio station with data at regular intervals. Too slow a rotation of the radiation pattern could lead for example to time gaps in the radio coverage of the radio station that are undesirable in terms of a "Quality of Service" (QoS) value that is to be complied with.

On the other hand each radio station requires a certain measuring time for determining the quality value and for reporting back the quality value to the radio station that is performing the rotation of the sampling radiation pattern. In addition processing time is required there in order to evaluate the reported quality values. These required times represent an obstacle in terms of increasing the speed of rotation of the radiation pattern.

In the event that a rotation is too fast, reported SINR values, based on which the radio transmission is specified, could already be out of date and could disadvantageously influence an efficient data transmission.

SUMMARY OF THE INVENTION

An aspect of the method is to improve controlling a fast and efficient radio transmission between radio stations.

With this method for controlling a radio transmission between radio stations at least one radiation pattern is formed on the part of a first radio station, which radiation pattern is rotated for the purpose of sampling a predefined angular range. Radio stations of the angular range determine respective quality values which can be used for the time-related assessment of a radiation pattern signal transmission. The quality values are reported back to the first radio station for evaluation.

At a first time of a rotation a second radio station is detected by the rotating radiation pattern, a first angular position of the radiation pattern being assignable to the first time. The second radio station determines a first quality value which can be assigned to the first angular position and reports the quality value back to the first radio station.

The first quality value is available for evaluation at the first radio station at a second time, a second angular position of the radiation pattern being assignable to the second time.

The first radio station controls the speed of rotation of the radiation pattern for subsequent rotations in such a way that the first angular position corresponds to the second angular position.

The second radio station preferably determines the quality values continuously in order to enable the time-related assessment of the radiation pattern signal transmission.

On the first radio station side a total time duration is known which is composed of:
- a time duration required for determining the quality value at the second radio station,
- a time duration required for transmitting or, as the case may be, reporting back the quality value from the second to the first radio station, and
- a time duration required on the part of the first radio station for the purpose of evaluating the reported quality values.

The time duration required for determining and reporting back the quality value is virtually identical for all the radio stations involved in the sampled angular range and can therefore be easily taken into account.

Owing to the controlled speed of rotation the angular position of the radiation pattern is exactly the same after the aforementioned time durations.

If the first radio station conducts a radio transmission to the second radio station based on the reporting of a "large" SINR value used as a quality value, it is ensured by the method described below that the radiation pattern points to the same angular position as at the time of the measurement of the large SINR value. Thus, it is possible that an actual quality value is virtually identical to an underlying measurement.

The method enables a rapid sampling of the predefined angular range, without the problem, described above, of out-of-date quality value measurements existing.

In an advantageous development a plurality of radiation patterns which are rotated simultaneously but offset with respect to one another are used for a more rapid sampling.

In a preferred development different speeds of rotation of the sampling radiation pattern are used for sampling edge zones of the predefined angular range.

BRIEF DESCRIPTION OF THE DRAWINGS

These and other objects and advantages will become more apparent and more readily appreciated from the following description of an exemplary embodiment, taken in conjunction with the accompanying drawings of which:

FIG. 1 is a polar graph illustrating the sampling of an angular range according to the related art, as described above, FIG. 2 is a polar graph illustrating the method for sampling a predefined angular range, FIG. 3 is a table indicating a time characteristic of the method used in FIG. 2, FIG. 8 is a polar graph illustrating a subdivision, according to FIG. 7, into respective sectors for different numbers of radiation patterns.

DETAILED DESCRIPTION OF EXEMPLARY EMBODIMENTS

Figure 4:
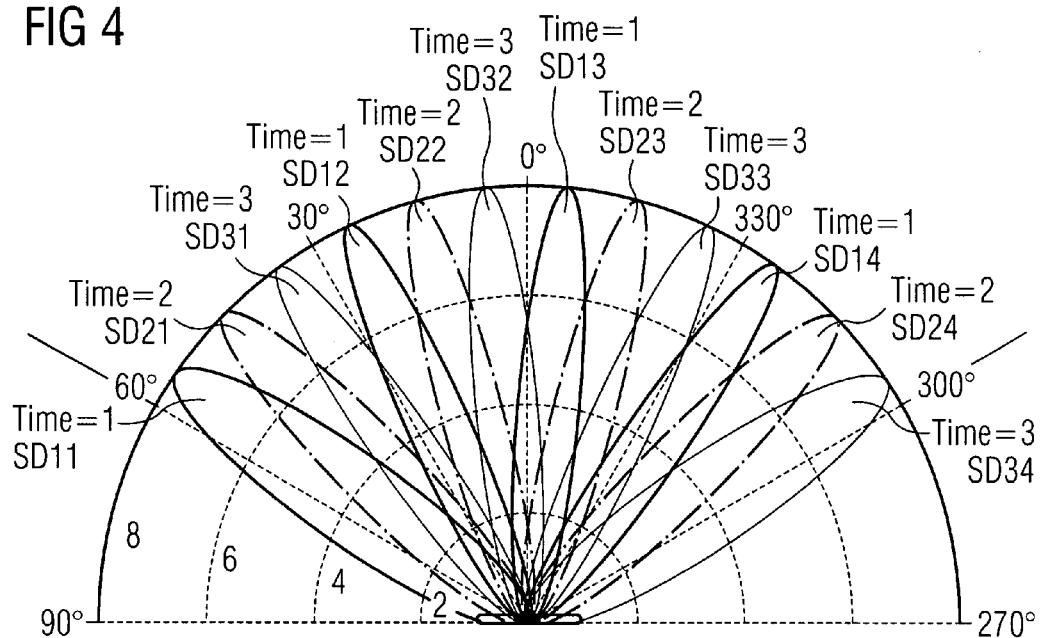
FIG. 4 is a polar graph illustrating an advantageous development of the method having a plurality of radiation patterns which are rotated offset with respect to one another for the purpose of sampling.

Reference will now be made in detail to the preferred embodiments, examples of which are illustrated in the accompanying drawings, wherein like reference numerals refer to like elements throughout.

FIG. 2 shows the method for sampling a predefined angular range WB. At a first time Time=1 a first subsection of an angular range WB which extends from 60° through 0° to 300° is sampled with the aid of a radiation pattern SD designated as w1. At a second time Time=2 a second subsection of the angular range WB is sampled with the aid of the radiation pattern SD, designated as w2, which is rotated through approx. 400 in relation to the radiation pattern SD=w1. At a third time Time=3 a third subsection of the angular range WB is sampled with the aid of the radiation pattern SD designated as w3, which is rotated through approx. 40° in relation to the radiation pattern SD=w2.

The radiation pattern SD is formed at the respective time Time on the part of a radio station FS which in this case is embodied by way of example as a base station BTS of a mobile radio system. The cited radiation patterns SD=w1 to SD=w3 can be assigned respective angular positions: thus, the radiation pattern SD=w1 points in a 45° direction viewed from the base station BTS, whereas the radiation pattern SD=w2 points in a 0° direction and the radiation pattern SD=w3 points in a 315° direction.

FIG. 3 shows the time characteristic of the method referred to in FIG. 2. A first radiation pattern SD=w1 is formed for example at a first time Time=1. The first radio station FS1 is detected by the radiation pattern SD=w1. A second radiation pattern SD=w2 which does not detect the first radio station FS1 but does detect a second radio station FS2 is formed at a second time Time=2. Similarly, a third radiation pattern SD=w3 which does not detect the first radio station FS1 but does detect a third radio station FS3 is formed at a third time Time=3.

The formation of the radiation patterns SD is repeated analogously for the following times Time=4 to Time=7. At the cited times Time=1 to Time=7 the radio station FS1 determines assignable quality values, in this case respective SNR values SINR1 to SINR7. The quality values SINR1 to SINR7 enable a time-related assessment of a signal transmission by the radiation pattern SD. The quality values SINR1 to SINR7 are reported back by the radio station FS1 to the base station BTS. An evaluation of the reported quality values SINR1 to SINR7 is carried out on the part of the base station BTS.

A total time duration is known on the part of the base station BTS, the total time duration being composed of:
- the time duration required for determining the quality value at the radio station FS1,
- the time duration required for transmitting or, as the case may be, reporting back the respective quality value SINR from the radio station FS1 to the base station BTS, and
- the time duration required on the part of the base station BTS for the purpose of evaluating the reported quality values.

In this case this total time duration corresponds to the difference between Time=1 and Time=3, i.e. to a value of three time durations with reference to times "Time".

The rotational movement is determined on the part of the base station BTS in such a way that the angular position w of the radiation pattern SD is exactly the same after the aforementioned time periods. If the base station performs a radio transmission to the radio station FS1 based on the reporting of a large measured SINR value, it is thereby ensured that the radiation pattern SD=w1 points to the same angular position w1 as at the time of the measurement of the large SINR value, which measurement is carried out on the part of the radio station FS1. Thus, the actual quality value SINR4 will essentially be identical to the underlying measured value SINR1.

According to the table shown, the speed of rotation of the radiation pattern SD is controlled in such a way that the maximum quality value SINR4 is determined accordingly at a time Time=4 at the radio station FS1.

The quality value SINR1 is present at the base station BTS at the time Time=4, with the result that on that basis the base station BTS can take the decision to perform a radio transmission to the radio station FS1. At precisely the time Time=4 the radiation pattern SD again points exactly in the direction of the angular position of 45°.

Accordingly, a maximum quality value SINR7 is again determined at the radio station FS1 at a time Time=7, while the quality value SINR4 is present on the part of the base station BTS for the purpose of controlling the radio transmission.

To sum up, the values SINR1 to SINR7 of 3 time periods in each case are available at the base station BTS, after they have been determined on the part of the radio station FS1.

Accordingly, the second quality value SINR2 is available on the part of the base station BTS at a time Time=5 at which the radiation pattern SD=w2 is formed, with the result that no radio transmission takes place from the base station BTS to the radio station FS1.

FIG. 4 shows an advantageous development of the method wherein a plurality of radiation patterns SD which are spatially offset with respect to one another are used for the sampling. Four radiation patterns SD11, SD12, SD13 and SD14 are formed simultaneously at a first time Time=1, while four radiation patterns SD21, SD22, SD23 and SD24 are formed simultaneously at a subsequent second time Time=2. Accordingly, four radiation patterns SD31, SD32, SD33 and SD34 are formed simultaneously at a third time Time=3 succeeding the first time Time=1 and the second time Time=2.

The radiation pattern SD11 is rotated through approx. 30° relative to the radiation pattern SD12. The offset by 30° applies analogously between the radiation patterns SD12 and SD13 and SD13 and SD14 respectively. The radiation pattern SD21 is rotated through approx. 30° relative to the radiation pattern SD22. The offset by 30° applies analogously between the radiation patterns SD22 and SD23 and SD23 and SD24 respectively. The radiation pattern SD31 is rotated through approx. 30° relative to the radiation pattern SD32. The offset by 30° applies analogously between the radiation patterns SD32 and SD33 and SD33 and SD34 respectively.

The simultaneous forming of four radiation patterns SD at a time Time speeds up the sampling of the angular range, resulting in an advantageous rotation of four sampling radiation patterns SD between the times Time.

With regard to the times Time, a rotation through approx. 10° of the respective radiation patterns takes place from time Time=1 to time Time=2 and from time Time=2 to time Time=3.

Figure 5:
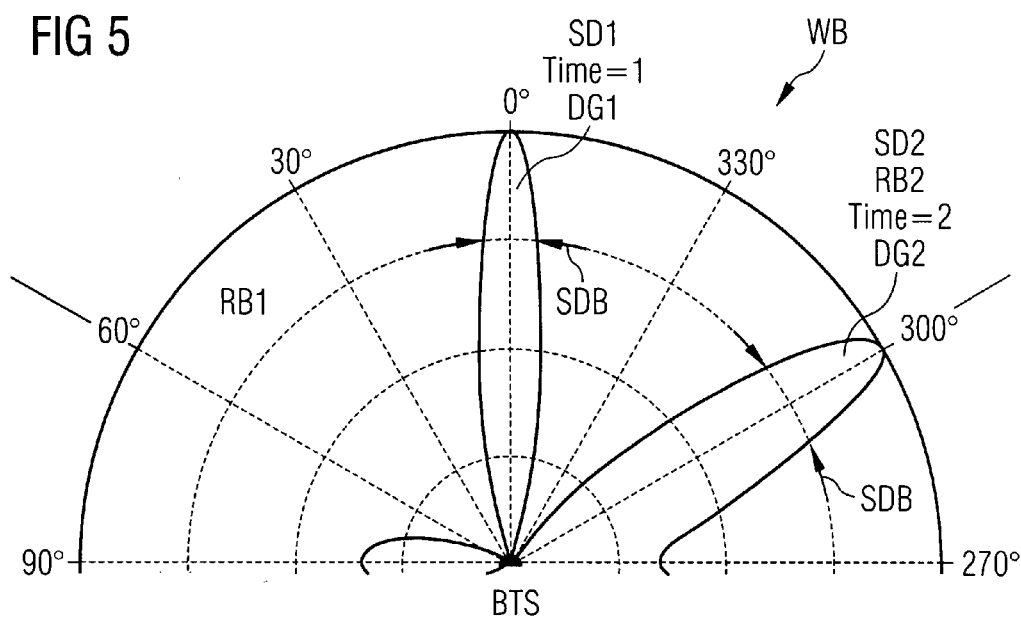
FIG. 5 is a polar graph illustrating an advantageous development of the method having different speeds of rotation of the radiation pattern.

FIG. 5 shows an advantageous development of the method having different speeds of rotation DG of the radiation pattern SD.

The predefined angular range WB, which extends from 60° through 0° to 300°, has two edge zones RB1 and RB2, with a first edge zone RB1 being assigned a 60° direction of the angular range WB, while a second edge zone RB2 is assigned a 300° direction of the angular range WB. In a 0° direction a first radiation pattern SD1 is formed by a base station BTS at a first time Time=1. The radiation pattern SD1 is rotated at a first speed of rotation DG1 in the vicinity of the 0° direction. In the 300° direction a second radiation pattern SD2 is formed by the base station BTS at another time Time=2. The radiation pattern SD2 is rotated at a second speed of rotation DG2 in the vicinity of the 300° direction.

The speed of rotation DG2 can be chosen greater in relation to the speed of rotation DG1, since the second radiation pattern SD2 has a greater radiation pattern width SDB than the first radiation pattern SD1.

Figure 6:
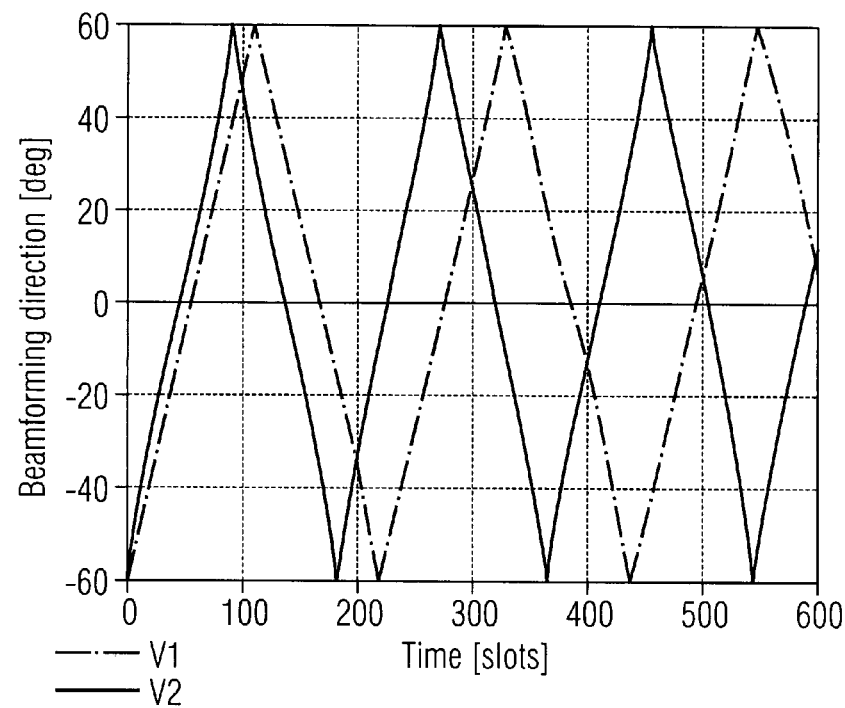
FIG. 6 is a graph of a comparative time characteristic of samplings used in FIG. 5.

FIG. 6 shows a comparative time characteristic of the sampling referred to FIG. 5. In the graph shown the time is plotted on the horizontal axis, while a radiation pattern direction designated as the "Beamforming direction" is plotted on the vertical axis. A first curve V1 shows a sampling of an angular range that is performed at a uniform speed of rotation of a radiation pattern. A second curve V2 shows a sampling of an angular range that is performed at different speeds of rotation of the radiation pattern with reference to the description of FIG. 5. It can be seen that the second curve V2 allows a faster sampling of the angular range than the first curve V1.

Figure 7:
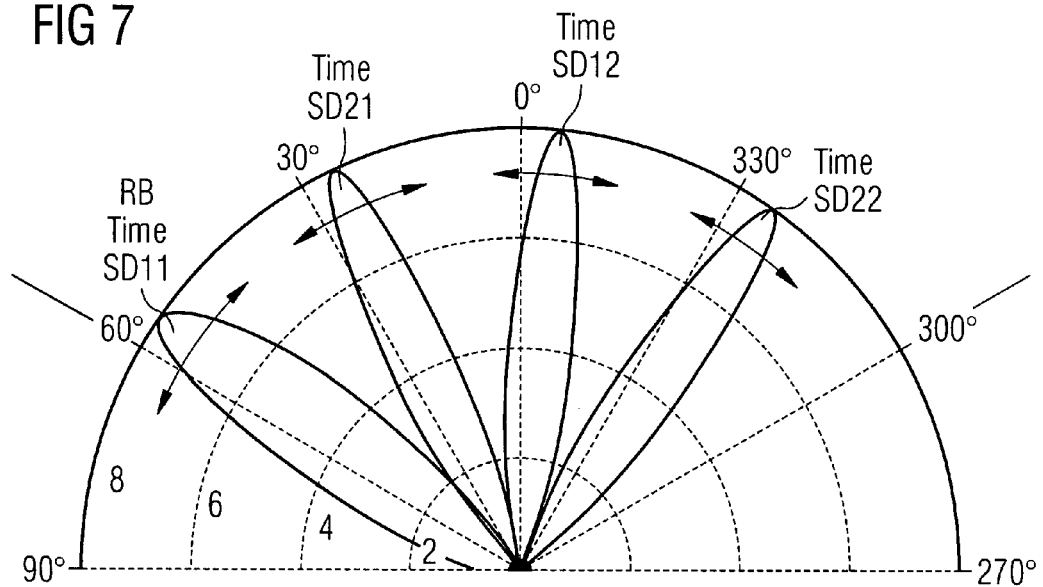
FIG. 7 is a polar graph illustrating an advantageous development of the method illustrated in FIGS. 4 and 5, wherein a plurality of radiation patterns are rotated offset with respect to one another for the purpose of sampling.

FIG. 7 shows an advantageous development of the method wherein, analogously to FIG. 4, a plurality of radiation patterns SD spatially offset with respect to one another are used for the sampling. In this case four radiation patterns SD11 to SD22, which are rotated through approx. 30° with respect to one another in each case, are formed at a time Time.

Referring to FIG. 5, the two outer radiation patterns SD11 and SD22 are rotated faster than the two radiation patterns SD12 and SD21.

FIG. 8 shows a subdivision, with reference to FIG. 7, into respective sectors or sub-areas for different numbers of radiation patterns.

If a number B=5 of radiation patterns are formed at a time Time, five sub-areas to be sampled are produced as a result, where:

a first sub-area TB1 extends from 60° to 32°, a second sub-area TB2 extends from 32° to 8°, a third sub-area TB3 extends from 8° through 0° to 352°, a fourth sub-area TB4 extends from 352° to 328°, and a fifth sub-area TB5 extends from 330° to 300°.

If a number B=4 of radiation patterns are formed at a time Time, four sub-areas to be sampled are produced as a result, where:

a first sub-area TB1 extends from 60° to 25°, a second sub-area TB2 extends from 25° to 0°, a third sub-area TB3 extends from 0° to 335°, and a fourth sub-area TB4 extends from 335° to 300°.

If a number B=3 of radiation patterns are formed at a time Time, three sub-areas to be sampled are produced as a result, where:

a first sub-area TB1 extends from 60° to 20°,
a second sub-area TB2 extends from 20° through 0° to 240°, and
a third sub-area TB3 extends from 240° to 300°.

It can be seen that at each of the three resolutions the respective sub-areas in the section of the 0° direction are narrower than the sub-areas which are assigned to the two edge zones in the 300° direction and in the 60° direction. The cited sector boundaries are adjusted in order to enable the radiation patterns to be pivoted synchronously.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method for controlling a radio transmission between radio stations, comprising:
   rotating at least one radiation pattern of a first radio station for sampling over a predefined angular range;
   detecting a second radio station at a first time of said rotating of the at least one radiation pattern, the first time corresponding to a first angular position within the predefined angular range;
   determining at the second radio station a first quality value which can be assigned to the first angular position;
   reporting back the first quality value to the first radio station to make the first quality value available for evaluation at the first radio station at a second time corresponding to a second angular position of The at least one radiation pattern; and
   controlling at the first radio station a speed of rotation of the at least one radiation pattern for subsequent rotations so that the first angular position corresponds to the second angular position.

2. The method as claimed in claim 1, wherein said rotating uses a plurality of radiation patterns simultaneously for sampling the predefined angular range.

3. The method as claimed in claim 2, wherein the speed of rotation of the plurality of radiation patterns is a function of predefined sub-areas of the angular range.

4. The method as claimed in claim 3, wherein said rotating of the plurality of radiation patterns takes place faster in edge zones of the angular range than in central zones.

5. The method as claimed In claim 4, wherein the predefined angular range is subdivided into sectors, each having a sector width that Is a function of the speed of rotation.

6. The method as claimed in claim 5, further comprising determining the second time based on the speed of rotation and a total time duration of a first time duration far determining quality values by radio stations within the predefined angular range, a second time duration for reporting back the quality values and a third time duration for evaluating the quality values.

7. The method as claimed in claim 3, wherein the predefined angular range is subdivided into sectors, each having a sector width that is a function of the speed of rotation.

8. The method as claimed in claim 7, further comprising determining the second time based on the speed of rotation and a total time duration of a first time duration for determining quality values by radio stations within the predefined angular range, a second time duration for reporting back the quality values and a third time duration for evaluating the quality values.

9. The method as claimed in claim 3, further comprising determining the second time based on the speed of rotation and a total time duration of a first time duration for determining quality values by radio stations within the predefined angular range, a second time duration for reporting back the quality values and a third time duration for evaluating the quality values.

10. The method as claimed in claim 2, further comprising determining the second time based on the speed of rotation and a total time duration of a first time duration for determining quality values by radio stations within the predefined angular range, a second time duration for reporting back the quality values and a third time duration for evaluating the quality values.

11. The method as claimed in claim 1, further comprising determining the second time based on the speed of rotation and a total time duration of a first time duration for determining quality values by radio stations within the predefined angular range, a second time duration for reporting back the quality values and a third time duration for evaluating the quality values.

12. The method as claimed in claim 1 wherein the speed of rotation of the at least one radiation pattern is a function of predefined sub-areas of the angular range.

13. The method as claimed in claim 3, wherein said rotating of the at least one radiation pattern takes place faster in edge zones of the angular range than in central zones.

* * * * *